/ Patented Apr. 6, 1954

2,674,585

UNITED STATES PATENT OFFICE 2,674,585

PLASTISOLS OF VINYL CHLORIDE POLYMER

Fred E. Condo, El Cerrito, and Herbert A. Newey, Lafayette, Calif., assignors to Shell Development Company, Emeryville, Calif., a corporation of Delaware No Drawing. Application July 24, 1951, Serial No. 238,394

6 Claims. (Cl. 260—23)

This invention relates to a new plastisol which contains polymer of vinyl chloride and to a method for its production.

Plastisols are compositions containing finely divided polymer of vinyl chloride dispersed and suspended in a liquid organic plasticizer for the polymer. At room temperature, the compositions are spreadably fluid and have the consistency of paste. When the plastisols are heated to an elevated temperature, fusion and dissolution of the polymer particles occur so that when the mixture is cooled, a gelled plastic composition is obtained. The gelled plastic has excellent physical properties and the plastisols are therefore very useful in a variety of applications. If it were not poor electrical resistivity of the gelled plastic, the plastisols known heretofore could be applied in forming electrical insulating materials. Thus, except for the poor electrical resistivity, plastisols would be useful for manufacture of an insulation coating on wire employed in electrical uses. However, the use of metallic soaps and other metal containing emulsifying agents in producing the polymer of vinyl chloride by emulsion polymerization processes results in ionizable metal emulsifying agent being carried in the polymer to the final gelled compositions. As a consequence thereof, the gelled plastic is too conductive of electricity for electrical purposes, i. e., its electrical resistivity is too low owing to the presence of the residual emulsifying agent occluded and contained in the polymer.

We have now found that by manufacturing polyvinyl chloride in an emulsion system wherein there is used an ammonium salt of a monobasic acid of 8 to 20 carbon atoms as emulsifying agent while also using a non-metallic peroxide polymerization catalyst and forming a plastisol from the resulting polymer, the final gelled plastic has the very high electrical resistivity needed for insulating purposes. Although the ammonium salt is also carried over and occluded in the polymer, and is itself an ionizable substance giving rise to conduction of electricity, the gelled plastic has electrical resistivity of one hundred to one thousand or more times higher than that of polymer produced with use of a metal-containing emulsifying agent. The reason for this markedly superior property of our plastisols is not fully understood. The residual ammonium emulsifying agent in the polymer decomposes partly or completely with escape of ammonia when the formed polymer is recovered and dried, but it was unexpected to find the unusually high electrical resistivity for the gelled plastic because the acid residues from the decomposed emulsifying agent, whether weak carboxylic or strong sulfur acids, must remain in the polymer.

In brief, the invention is the improvement of preparing a plastisol which gives a gelled composition having high electrical resistivity by mixing a neutral liquid ester plasticizer with a finely divided polymer vinyl chloride, which polymer is obtained by polymerizing liquid vinyl chloride as an aqueous emulsion and the polymer is recovered without contact of the polymer with a strong electrolyte, i. e., one that does not obey Ostwald's dilution law, other than an ammonium salt emulsifying agent. The invention also includes the novel plastisol composition.

The ammonium salt emulsifying agent employed in producing the polymer of vinyl chloride embraces a variety of substances. In general, this emulsifying agent in an ammonium salt of an organic acid having the acid group selected from the class consisting of carboxylic acid, sulfonic acid, and hydrogen sulfate groups, which acid group is linked directly to a radical containing 8 to 20 carbon atoms which is otherwise free of salt-forming and ionizable groups. Particularly suitable are the ammonium salts of the higher fatty acids such as ammonium caprate, laurate, myristate, palmitate, stearate, arachidate, oleate, or linoleate as well as ammonium salts of other higher monocarboxylic acids such as ammonium paratertiary butyl benzoate, isopropyl benzoate, beta-cyclohexylpropionate or rosinate. Also suitable are ammonium salts of lauryl sulfonic acid, stearyl sulfonic acids, sulfonated castor oil, sulfonated mineral oil, alkyl benzene sulfonic acid, and dioctyl sulfosuccinate as well as ammonium salts of lauryl hydrogen sulfate, stearyl hydrogen sulfate, and the like. If desired, mixtures of two or more ammonium salt emulsifying agents are used.

In effecting the emulsion polymerization of the liquid vinyl chloride, the amount of ammonium salt emulsifying agent contained in the aqueous phase may be varied considerably. Based upon the weight of aqueous phase, the concentration is ordinarily about 0.1 to 2%, although it may be up to 5%. Very good results are obtained with use of about 0.5% by weight of ammonium salt emulsifying agent in the aqueous phase. A preformed ammonium salt may employed, or the ammonium salt may be formed in situ by adding ammonia (aqueous ammonium hydroxide solution being convenient) to the water and adding the acid to the liquid vinyl chloride so that upon bringing the monomer into admixture with the aqueous phase, the ammonium salt emulsifying agent is formed. In this latter case, the amounts of ammonia and acid are so chosen to give the desired quantity of salt. Exact neutralization is not necessary since a small excess of either the acid or the ammonia may be present in the polymerization system, preferably the acid in excess. Furthermore, it is useful to also have present a neutral emulsifying adjuvant such as lauryl alcohol in amount up to about a weight equal to that of the emulsifying agent.

In order to have polymer of good quality for use in plastisols, the polymer has a high molecular weight. This is assured in the present process by use in combination of three features, namely, the monmer subjected to polymerization, the temperature of polymerization, and the use of a monomer-soluble peroxy polymerization catalyst. It has been found best to employ vinyl chloride as sole polymerizable compound. However, polymer which may be employed in plastisols is obtainable provided not more than about 5% by weight of another mono-olefinic polymerizable compound is mixed with the vinyl chloride subjected to polymerization in the process. For this purpose, vinyl acetate is particularly suitable, but other mono-olefinic compounds which contain the polymerizable group $CH_2=C<$ and no other polymerizable group such as vinyl bromide, vinyl formate, vinyl benzoate, vinylidene chloride, methyl acrylate, acrylonitrile, methyl methacrylate, styrene and the like, may be used.

About 0.1 to 5% of monomer-soluble peroxy polymerization catalyst is dissolved in the liquid vinyl chloride alone or the liquid mixture of vinyl chloride containing the limited amount of other mono-olefinic compound. Lauroyl peroxide gives excellent results and its use is preferred. Other suitable peroxides include caprylyl peroxide, stearoyl peroxide, benzoyl peroxide, acetylbenzoyl peroxide, p-chlorobenzoyl peroxide, 2,4-dichlorobenzoyl peroxide, tertiary-butyl perbenzoate, and like monomer-soluble, substantially water-insoluble peroxides well known in the art. The amount of peroxide used is not very critical. While proportions greater or less than the 0.1 to 5% by weight based upon the weight of monomer may be employed, it is in general preferred to use about 0.2 to 1%. Very good results are obtained with about 0.3% of lauroyl peroxide.

The liquid vinyl chloride containing the peroxide catalyst is mixed and emulsified with an aqueous solution containing the ammonium salt emulsifying agent in usual fashion as by stirring, for example. Based upon the weight of vinyl chloride, about 200 to 500% of aqueous solution is used. While larger proportions may be employed, their use is generally avoided because no advantage is realized. In fact, larger proportions result in necessity of correspondingly larger equipment and processing costs which are undesirable. In general, about 300% aqueous solution gives good results and is used, although from about 250 to 400% is also very suitable.

It is useful to homogenize the aqueous emulsion of liquid vinyl chloride prior to polymerization of the monomer. Homogenization of the emulsion referred to herein has reference to the accepted meaning in the emulsification art, namely, that the dispersed globules of very different diameters initially present in an emulsion have been reduced to a substantially equal diameter which is many times smaller than the average diameter of the globules present when the emulsion is first formed by ordinary mixing or stirring. The aqueous emulsion is homogenized by subjecting it to violent shearing action. Various machines and means may be employed to effect the homogenization. The homogenization of the emulsion can be attained in a colloid mill where the emulsion is passed between a rotor and stator with very small clearance, and the action of the rapidly rotating rotor subjects the emulsion to extreme disruptive forces resulting in formation of very fine dispersions. Since the emulsion employed in the invention contains liquid vinyl chloride which is a gas at ordinary temperatures, it is necessary to maintain the emulsion under pressure to keep the vinyl chloride in liquid state. It is, therefore, preferred to effect the homogenization by forcing the emulsion thorugh an orifice or homogenizing valve where the rapid rate of passage through the aperture results in violent shearing action on the emulsion and reduces the globules of liquid monomer to a small state of subdivision.

The extent of homogenization of the monomer emulsion is preferably such that the polymer particles in the formed polymer emulsion are predominantly within the range of about 0.3 to 1.3 micron size and the majority are about 1 micron size. An insignificant proportion of about 1 to 3% of the weight may be present that has dimensions outside the noted range. This homogenization of the monomer emulsion is not obtained with ordinary agitation employing a customary stirrer in a polymerization vessel. It is necessary to use a homogenizer of some type in order to effect the needed homogenization. However, it is undesirable to homogenize to such extent that the average particle size of the polymer is materially smaller than indicated above because the plastisol prepared from such polymer will tend to be unduly thixotropic. Very suitable homogenization can be obtained by passage of the emulsion at least once through an aperture of not above about 0.03 inch diameter such as about 0.005 to 0.03 inch diameter at sufficient rate so there is a pressure drop of above 100 pounds per square inch across the aperture. Preferably two passes at such a rate that there is a pressure drop of about 200 pounds per square inch across an aperture of about 0.016 inch diameter is usefully employed. The pressure drop across the aperture has reference to the difference between the pressure before and after passage of the emulsion through the aperture. The pressure on the emulsion after passage through the aperture, is, of course, at least sufficient to maintain the vinyl chloride in liquid condition. If desired, a single passage of the emulsion through a series of apertures with suitable pressure drop across each can be used as well as a plurality of apertures with flow therethrough in parallel relationship.

Polymerization of monomer in the homogenized emulsion is effected by heating the emulsion with agitation at a temperature below 60° C. for at least 15.5 hours. The temperature of polymerization is of extreme importance because, as noted previously, it is necessary that the polymer have high molecular weight for use in plastisols, and because the temperature of polymerization is reflected directly in the molecular weight of the polymer. Polymerization of vinyl chloride at temperatures appreciably above 60° C. gives a polymer of too low molecular weight for plastisol use. By polymerizing at a temperature of about 30° C. to 60° C., the polymer has proper molecular weight. However, it is generally preferred to operate at about 40° C. to 45° C.

The polymerization of monomer in the homogenized emulsion is effected in usual fashion while using a temperature within the above-noted limits. Thus there is used a closed vessel fitted with an agitator and means for initially heating the contents as well as means for such cooling as may be necessary to remove the exothermic heat of reaction after the polymerization is under way. Any vapor space in the reaction vessel is kept free of oxygen which inhibits the reaction, and sufficient pressure is employed to maintain the homogeneously emulsified vinyl chloride in liquid state.

After the polymerization and prior to coagulation of the polymer emulsion, it is advantageous to subject the polymer to a heat treatment whereby polymer is obtained that gives a plastisol which does not thicken and increase appreciably in viscosity upon aging. This treatment is conveniently effected by heating the emulsion of polymer at about 90° C. to 160° C. for a time of about 10 seconds to less than the time which causes appreciable agglomeration and coagulation of the polymer, during the whole time of which the polymer particles are maintained in intimate contact with liquid water. In any event, the polymer emulsion is substantially degassed by vinyl chloride. Any residual monomer other than the vinyl chloride will not be present in sufficient amount to adversely affect the polymeric product for plastisol uses.

The heat treatment needed to achieve the desired effect is obtained in a very short time which in general is at most only a few minutes. For optimum results, the time and temperature are correlated. For example, with polyvinyl chloride emulsion, heating for 15 seconds is adequate at 140° C., but it will require about twice as long at 110° C. to obtain the same effect. As a customary matter, the time and temperature are correlated so that when the resultant polymer is compounded into a plastisol consisting of two parts by weight of polymer and one part by weight of di(2-ethylhexyl) phthalate, the viscosity of the plastisol will be less than 40,000 centipoises at 25° C. after storage at 25° C. for 30 days' time from compounding the plastisol. Ordinarily, operation at a temperature of about 100° C. to 140° C. is preferred. The maximum length of time for heating is not unduly critical. The heating is merely not continued until there is appreciable agglomeration and coagulation of the emulsified polymer particles, which fact is readily determined by visual examination of the polymer emulsion. There is usually no coagulation whatsoever.

Best results are obtained by effecting the heating with the emulsion under sufficient pressure that boiling does not occur. A convenient means for conducting the heating step is to pump the emulsion under pressure through a tube which is heated in one section and has a cooling zone following. The rate of flow is regulated so that the residence time in the heating zone gives the desired period of heating. The emulsion is then cooled as rapidly as possible in the cooling zone. Since the heating and cooling involves transfer of considerable amounts of heat, the internal diameter of the tube is chosen in relation to the rate of flow of emulsion therethrough so the flow is turbulent and good heat transfer is thereby obtained. Although best results are secured without boiling, the emulsion may be boiled to accomplish conditioning of the polymer particles by the heating. However, is is essential that polymer particles be maintained in contact with liquid water during the whole of the heating period. If the heating is effected by boiling, the loss of part of the water of the emulsion is permissible, but the emulsion cannot be boiled dry because this makes the polymer unsuitable for plastisol use.

The heat treatment of the emulsified polymer is effected without appreciable polymerization of any vinyl chloride therein. Since the time of heating employed to effect the thermal treatment is so brief, there is little opportunity for residual monomeric vinyl chloride to polymerize during the heat treatment. Furthermore, the polymer emulsion, even when taken directly from the polymerization step to the thermal treating step, contains a very low concentration of residual monomer since the polymerization step is ordinarily conducted so there is about an 80 to 95% conversion of monomer to polymer. Although direct transfer between steps may be employed, it is more usual to release the pressure on the polymer emulsion following the polymerization step and this operation enables unpolymerized vinyl chloride to boil off from the emulsion. The reduction in pressure to atmospheric pressure may be effected with the hot emulsion at polymerization temperature (not above 60° C.), or after cooling to atmospheric temperature (about 20° C.), or any temperature therebetween. Such procedure assures a low concentration of residual monomer in the polymer emulsion subjected to heat treatment even though the conversion of monomer to polymer was not high, e. g., only 50%. Additionally, the polymer emulsion from the polymerization step is often allowed to come into contact with air and this effectively inhibits the occurrence of polymerization during the subsequent thermal treating step. By having the polymer emulsion substantially free of monomeric vinyl chloride, i. e., contain less than 10% of the amount of vinyl chloride originally present in the monomer emulsion subjected to polymerization, essentially no polymerization occurs during the heat treating step. Regardless of preliminary procedure, any residual monomer other than vinyl chloride will not be present in sufficient amount in the polymer emulsion during the relatively brief heat treatment to effect the polymeric product adversely for plastisol uses.

The polymer emulsion (which may or may not have been subjected to the heat treatment) is subjected to coagulation for separation of the polymer particles from the aqueous medium. The coagulation procedure employed is one which avoids contamination of the polymer with an electrolyte, e. g., a metal salt such as sodium chloride or magnesium sulfate. An excellent way to effect coagulation without contamination is by the well-known freezing method wherein the polymer emulsion is frozen after which the frozen emulsion is permitted or forced to warm up and the polymer is obtained in coagulated condition so that it can be filtered from the aqueous medium. Another way is to add about 1 to 4 volumes of a lower alcohol such as methanol or ethanol to the polymer emulsion, which operation also breaks the emulsion and effects coagulation.

The coagulated polymer is separated from the aqueous medium by filtration or centrifugation. It is customary to wash the separated polymer particles and/or a lower alcohol to clean the product. The polymer is then dried which is best done at normal temperature of about 15° C. to 30° C. This operation is aided with use of reduced pressure such as vacuum of about 20 mm. pressure. Higher temperatures may be used in the drying operation, but care must be observed that the temperature is not so high as to cause the particles to fuse together.

The new plastisols are compounded by mixing or kneading the powdery polymer with about an added 40% to 125% by weight of liquid ester plasticizer. The ester plasticizer is substantially non-volatile in having a boiling point of at least 250° C. or above about 125° C. under 1 mm. Hg pressure. The ester is also compatible with the polymer upon gelation of the plastisol. The alkyl and alkoxyalkyl esters of dicarboxylic acids are particularly preferred. Other liquid ester plasticizers as well known in the art can also be used. Among representative examples are dibutyl phthalate, diamyl phthalate, dioctyl phthalate, especially di(2-ethylhexyl) phthalate, diallyl phthalate, butyrin, dibutyl diglycolate, dibutyl sebacate, dibenzyl sebacate, dioctyl maleate, butyl acetylricinoleate, butyl phthalyl butyl glycolate, triethylene glycol dioctanoate, dibutyl Cellosolve phthalate, dibutyl carbitol phthalate, tricresyl phosphate, trioctyl phosphate, tributoxyethyl phosphate, and the like. The ester plasticizer is neutral in the sense of being neither appreciably acidic nor basic. Preferably the compatible liquid ester plasticizer boils above 300° C. or above about 140° C. at 1 mm. Hg pressure.

The plastisol is prepared in the same manner as those known heretofore. The finely divided resin is added to the liquid plasticizer and mixing is effected by simple stirring or kneading at ordinary temperature until the polymer particles are uniformly dispersed and suspended in the ester plasticizer. If desired, an ink mill employing only a few passes may be used, but care must be exercised to cool the rolls because heat will thicken the paste mixture. Stabilizers may also be incorporated to inhibit deterioration of the polymer. For this purpose, substantially non-volatile glycidyl ethers are suitable such as the glycidyl ether of beta-naphthol or the diglycidyl diether of bisphenol. Also suitable is basic lead stearate.

In utilizing the compositions of the invention, the plastisol is applied to the surface of an article by the usual methods of spreading or dipping, and the applied material is then fused and gelled with heat whereby homogeneity of the liquid ester with the fused polymer is achieved. For this purpose, heating at about 170° C. to 200° C. for about 3 to 15 minutes is usually satisfactory. The resulting gelled plastic composition not only has outstanding physical strength, but it also has the desired high electrical resistivity so as to permit its use as an electrical insulating material.

The invention is illustrated in the following examples, but is not to be construed as limited to details described therein. The parts and percentages are by weight.

*Example 1*

The homogenization of a vinyl chloride emulsion was effected in an apparatus comprising two stainless steel cylinders connected with 1/4-inch tubing having an orifice therein of 1/64-inch diameter through a 0.01-inch platinum plate. The cylinders were also connected with another 1/4-inch tubing as by-pass to permit transfer of the contents of one cylinder to the other without passage through the orifice. The contents of the cylinders were forced from one to the other with nitrogen gas under pressure. The apparatus was operated with the cylinder undergoing filling being maintained at 100 pounds per square inch and the other cylinder at 300 pounds pressure so there was a pressure drop across the orifice of 200 pounds. The vinyl chloride emulsions in all examples herein were prepared by first emulsifying the mixture of all ingredients with two passes through the by-pass, and then homogenizing the resulting emulsion by two passes through the orifice across which there was a pressure drop of 200 pounds per square inch.

A solution of 100 parts liquid vinyl chloride having dissolved therein 0.3 part lauroyl peroxide, 0.5 part lauryl alcohol and 0.94 part stearic acid was mixed with 300 parts of water containing 0.17 part of ammonia. The mixture was emulsified (the ammonium stearate as emulsifying agent forming in situ) and the emulsion homogenized as described above. The homogenized emulsion was transferred to an elongated glass polymerization tube and hermetically sealed. The tube was filled nearly full and had only vinyl chloride and water vapor in the space above the homogenized emulsion. Polymerization of the liquid vinyl chloride was effected by slowly tumbling the tube for 16 hours in a thermostat bath set at 40° C. The tube was then opened while hot and the small amount of monomeric vinyl chloride vented. The polymer emulsion was next sealed in a thin walled glass tube and the tube was heated in a closed autoclave for 5 minutes with live steam at 140° C. after which the tube was cooled with a water spray and opened. The polymer in the emulsion was coagulated by freezing the emulsion, allowing the formed ice to melt, and filtering the precipitated polymer from the aqueous medium. The polymer was then washed with water and dried at about 30° C. in vacuo.

A smooth fluid plastisol was obtained upon compounding 100 parts of the finely divided polyvinyl chloride with 50 parts of di(2-ethylhexyl) phthalate. The plastisol had a viscosity of 24,500 centipoises at 25° C. as measured with a Brookfield Syncro-Lectric Viscometer. The gelled plastic composition, which also contained an added 1.3% of basic lead stearate as heat stabilizer, had an electric volume resistivity of $49 \times 10^{12}$ ohm-cm. by measurement according to A. S. T. M. designation D257-46.

*Example 2*

Finely divided polyvinyl chloride was prepared exactly the same as described in Example 1 except that instead of using ammonia and stearic acid to form ammonium stearate as emulsifying agent, there was used with the 100 parts of liquid vinyl chloride 0.5 part of sodium lauryl sulfate (Duponol ME). The recovered polyvinyl chloride also formed a smooth plastisol with an added 50% of di(2-ethylhexyl) phthalate. The plastisol had a viscosity of 6,000 centipoises at 25° C. However, the gelled plastic composition also containing an added 1.3% of basic lead stearate had a volume resistivity of only $0.15 \times 10^{12}$ ohm-cm.

A plastisol of the same composition was prepared from a commercial grade of polyvinyl chloride known as Geon 121. The gelled plastic from this plastisol was found to have a volume resistivity of only $0.086 \times 10^{12}$ ohm-cm.

Example 3

Polyvinyl chloride was produced as described in Example 1 except that 1.5 parts of the ammonium salt of mono-ethylphenylphenolsulfonic acid (Beaconol 5) was used as emulsifying agent without the lauryl alcohol for the 100 parts of liquid vinyl chloride, that the vinyl chloride was polymerized for 22 hours at 42° C., and that the resulting polymer emulsion was heat treated by gentle boiling at about 100° C. for 10 minutes. The plastisol of the same composition described in Example 1 was smooth and fluid in having a viscosity of 45 poises at 25° C. The gelled plastic composition of the same constitution as described in Example 1 had a volume resistivity of $17 \times 10^{12}$ ohm-cm.

Example 4

Sodium alkylbenzene sulfonate (Nacconol NRSF) was used as emulsifying agent in amount of 1.5 parts per 100 parts of vinyl chloride to produce polymer in otherwise the same manner described in Example 1. The plastisol containing 100 parts of polymer with 50 parts of di(2-ethylhexyl) phthalate was a smooth fluid having a viscosity of 16,000 centipoises at 25° C. The volume resistivity of the gelled plastic composition containing the stabilizer as noted before was only $0.12 \times 10^{12}$ ohm-cm.

Example 5

A solution of 0.3 part lauroyl peroxide dissolved in 100 parts of liquid vinyl chloride was emulsified with a solution of 1.35 parts of ammonium laurate dissolved in 270 parts of water. The emulsion was homogenized and then charged into a stainless steel reaction vessel so as to nearly fill the same, the small vapor space being filled with vinyl chloride vapor. The reaction vessel was slowly tumbled and polymerization effected by heating at 45° C. for 24 hours. The unpolymerized vinyl chloride was vented and the polymer emulsion heat treated by gentle boiling at atmospheric pressure for 10 minutes. Coagulation was effected by freezing and the polymer recovered by filtration. The polymer was dried in vacuo at 30° C.

A plastisol prepared by mixing 50 parts of di(2-ethylhexyl) phthalate with 100 parts of polymer was a smooth fluid having a viscosity of 25,000 centipoises at 25° C. The gelled plastic composition which additionally contained an added 1.3% of basic lead stearate as heat stabilizer had a volume resistivity of $61 \times 10^{12}$ ohm-cm. The plastisols and gelled plastic compositions of polymer described in the examples to follow had the same proportions and kind of added constituents.

Example 6

Polyvinyl chloride was prepared as described in Example 5 except that the emulsifying agent was formed in situ by having 1.38 parts of lauric acid dissolved in the 100 parts of liquid vinyl chloride and 0.42 part of ammonia in the aqueous phase. The homogenized emulsion also contained 0.5 part of lauryl alcohol and polymerization was effected by heating for 20.5 hours at 40° C. The smooth plastisol had a viscosity of 10,000 centipoises at 25° C. and the corresponding gelled plastic had a volume resistivity of $43 \times 10^{12}$ ohm-cm.

Example 7

Polyvinyl chloride was prepared as described in Example 5 except that ammonium 12-hydroxystearate was employed as emulsifying agent, it being formed in situ by having 1.28 parts of 12-hydroxystearic acid dissolved in the 100 parts of liquid vinyl chloride and a stoichiometric excess of ammonia necessary to neutralize the acid was contained in the aqueous phase. The polymerization was conducted for 21 hours at 40° C. The smooth plastisol had a viscosity of 35,000 centipoises at 25° C. and the volume resistivity of the gelled plastic was $150 \times 10^{12}$ ohm-cm.

Example 8

Ammonium beta-cyclohexylpropionate was employed as emulsifying agent in producing polyvinyl chloride in the same manner as described in Example 5 except that 2.25 parts of beta-cyclohexylpropionic acid were dissolved in the 100 parts of liquid vinyl chloride and 0.363 part of ammonia was contained in the water. The polymerization was effected at 40° C. in 15.5 hours. The resulting smooth plastisol had a viscosity of 6,000 centipoises at 25° C. and the gelled plastic had a volume resistivity of $99 \times 10^{12}$ ohm-cm.

Example 9

Polyvinyl chloride was produced as described in Example 5 except for the changes of having 2.5 parts of p-tert-butylbenzoic acid in the 100 parts of liquid vinyl chloride, having 0.34 part of ammonia in the aqueous phase and effecting the polymerization at 42.5° C. in 22 hours. The smooth plastisol had a viscosity of 5,500 centipoises at 25° C. and the gelled composition had a volume resistivity of $140 \times 10^{12}$ ohm-cm.

The significant results from the foregoing examples are summarized in the following table.

| Example | Emulsifying Agent | Viscosity of Plastisol in Centipoises at 25° C. | Volume Resistivity of Plastic Composition in ohm-cm. $\times 10^{12}$ |
|---|---|---|---|
| 1 | Ammonium stearate+lauryl alcohol. | 24,500 | 49 |
| 2 | Sodium lauryl sulfate+lauryl alcohol. | 6,000 | 0.15 |
| 3 | Ammonium mono-ethyl phenylphenolsulfonate. | 4,500 | 17 |
| 4 | Sodium alkylbenzene sulfonate+lauryl alcohol. | 16,000 | 0.12 |
| 5 | Ammonium laurate. | 25,000 | 61 |
| 6 | Ammonium laurate+lauryl alcohol. | 10,000 | 43 |
| 7 | Ammonium 12-hydroxystearate. | 35,000 | 150 |
| 8 | Ammonium beta-cyclohexyl propionate. | 6,000 | 99 |
| 9 | Ammonium p-tert-butylbenzoate. | 5,500 | 140 |

The results given in the above table clearly demonstrate the unexpectedly superior property achieved upon preparing plastisols from polyvinyl chloride obtained by effecting polymerization in aqueous emulsions containing ammonium salt emulsifying agents. These ammonium salts enable the ultimate gelled plastic compositions to have electrical resistivities at least one hundred times, and in some cases up to one thousand times, greater than is obtained with use of customary sodium salt emulsifying agents.

We claim as our invention:

1. An improved plastisol which gives upon gelation a plastic composition of extremely high electrical resistivity comprising a finely divided polymer of vinyl chloride uniformly dispersed and suspended in about 40% to 125% by weight of a liquid ester plasticizer boiling above about 125° C. under 1 mm. Hg pressure, said polymer produced by a process wherein liquid vinyl chloride in admixture with up to 5% by weight of another polymerizable compound containing one vinylidene radical as sole polymerizable group therein is polymerized as an emulsion in an aqueous medium at about 30° C. to 60° C. in the presence of a peroxy polymerization catalyst soluble in said monomer for a time of at least 15.5 hours, and the preparation and recovery of said polymer is effected with an ammonium salt emulsifying agent as the sole strong electrolyte employed in contact with said polymer, said emulsifying agent being an ammonium salt of an organic acid having the acid group selected from the class consisting of carboxylic acid, sulfonic acid, and hydrogen sulfate groups, which acid group is linked directly to a radical containing 3 to 20 carbon atoms which is otherwise free of salt-forming and ionizable groups.

2. The improved plastisol as defined by claim 1 wherein the polymer is polyvinyl chloride obtained by employing liquid vinyl chloride as sole polymerizable compound subjected to the polymerization.

3. The improved plastisol as defined by claim 1 wherein the ammonium salt emulsifying agent is ammonium stearate.

4. The improved plastisol as defined by claim 1 wherein the ammonium salt emulsifying agent is ammonium para tertiary butyl benzoate.

5. The improved plastisol as defined by claim 1 wherein the ammonium salt emulsifying agent is ammonium beta-cyclohexyl propionate.

6. The improved plastisol as defined by claim 1 wherein the ammonium salt emulsifying agent is ammonium 12-hydroxystearate.

References Cited in the file of this patent

UNITED STATES PATENTS

| Number | Name | Date |
|---|---|---|
| 2,322,309 | Morgan | June 22, 1943 |
| 2,414,934 | Denny | Jan. 28, 1947 |
| 2,553,916 | Halbig | May 22, 1951 |